(12) United States Patent  
Smithson et al.

(10) Patent No.: US 8,845,485 B2  
(45) Date of Patent: Sep. 30, 2014

(54) AUXILIARY POWER UNIT HAVING A CONTINUOUSLY VARIABLE TRANSMISSION

(75) Inventors: Robert Smithson, Cedar Park, TX (US); Brad P. Pohl, Leander, TX (US); Charles B. Lohr, Austin, TX (US); Javier Solis, Leander, TX (US); Terry Nielsen, Austin, TX (US); Scott T. McBroom, Round Rock, TX (US); Nicole Munguia, Cedar Park, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 185 days.

(21) Appl. No.: 13/438,625

(22) Filed: Apr. 3, 2012

(65) Prior Publication Data

US 2012/0258839 A1 Oct. 11, 2012

Related U.S. Application Data

(60) Provisional application No. 61/471,585, filed on Apr. 4, 2011.

(51) Int. Cl.
| | |
|---|---|
| *B60K 31/00* | (2006.01) |
| *B60K 25/02* | (2006.01) |
| *B60H 1/32* | (2006.01) |
| *F16H 61/664* | (2006.01) |
| *B60W 10/06* | (2006.01) |
| *F16H 15/42* | (2006.01) |
| *B60W 30/188* | (2012.01) |
| *B60W 10/101* | (2012.01) |

(52) U.S. Cl.
CPC ............. *B60H 1/3226* (2013.01); *B60K 25/02* (2013.01); *Y02T 10/76* (2013.01); *B60W 10/06* (2013.01); *B60H 1/3222* (2013.01); *F16H 15/42* (2013.01); *F16H 61/6648* (2013.01); *B60W 30/1886* (2013.01); *B60W 10/101* (2013.01)
USPC .......................................................... 477/42

(58) Field of Classification Search
USPC ........ 475/153, 5, 149, 214; 477/32, 37, 42, 7, 477/15, 17, 5, 115.5, 52; 701/22, 54, 58, 701/59, 60, 51
See application file for complete search history.

(56) References Cited

U.S. PATENT DOCUMENTS 719,595 A 2/1903 Huss
(Continued)

FOREIGN PATENT DOCUMENTS

| CH | 118064 | 12/1926 |
|---|---|---|
| CN | 1054340 | 9/1991 |

(Continued)

OTHER PUBLICATIONS

Thomassy: An Engineering Approach to Simulating Traction EHL. CVT-Hybrid International Conference Mecc/Maastricht/The Netherlands, Nov. 17-19, 2010, p. 97.

(Continued)

*Primary Examiner* — Saul Rodriguez
*Assistant Examiner* — David J Hlavka
(74) *Attorney, Agent, or Firm* — Knobbe Martens Olson & Bear LLP

(57) ABSTRACT

Inventive embodiments are directed to components, subassemblies, systems, and/or methods for auxiliary power units (APU). In one embodiment, the APU includes a source of rotational power such as a combustion engine operably coupled to a continuously variable transmission (CVT). The CVT can be coupled to a load. In some embodiments, the load is provided by a generator. In one embodiment, the APU has a control system configured to control the operation of the engine and the operation of the CVT. The control system can facilitate substantially constant speed operation of the generator in the presence of variable operation of the engine. In another embodiment, the APU includes a continuously variable accessory drive (CVAD) operably coupled to an engine. The CVAD can include a continuously variable transmission operably coupled to a generator. In one embodiment, a skew-based control system is adapted to facilitate a change in the ratio of a CVAD.

13 Claims, 12 Drawing Sheets

(56) References Cited

U.S. PATENT DOCUMENTS

| | | |
|---|---|---|
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,092 A | 5/1927 | Arter et al. |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Alain Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Georges |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Azuma et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,630,839 A | 12/1986 | Seol |
| 4,631,469 A | 12/1986 | Tsuboi et al. |
| 4,651,082 A | 3/1987 | Kaneyuki |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |

(56) References Cited

U.S. PATENT DOCUMENTS

| | | |
|---|---|---|
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Koide et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidarn |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 * | 8/2002 | Takagi et al. .......... 477/37 |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |

(56) References Cited

U.S. PATENT DOCUMENTS

| | | |
|---|---|---|
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 * | 5/2012 | Pohl et al. ..................... 475/189 |
| 8,171,636 B2 | 5/2012 | Smithson et al. |
| 8,313,404 B2 | 11/2012 | Carter et al. |
| 8,313,405 B2 | 11/2012 | Bazyn et al. |
| 8,382,637 B2 | 2/2013 | Tange |
| 8,393,989 B2 | 3/2013 | Pohl |
| 8,469,853 B2 | 6/2013 | Miller et al. |
| 8,480,529 B2 * | 7/2013 | Pohl et al. ..................... 475/186 |
| 8,496,554 B2 | 7/2013 | Pohl et al. |
| 8,506,452 B2 | 8/2013 | Pohl et al. |
| 8,550,949 B2 | 10/2013 | Miller |
| 8,585,528 B2 | 11/2013 | Carter et al. |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0216216 A1 | 11/2003 | Inoue et al. |
| 2003/0221892 A1 | 12/2003 | Matsumoto et al. |
| 2004/0058772 A1 | 3/2004 | Inoue et al. |
| 2004/0082421 A1 | 4/2004 | Wafzig |
| 2004/0119345 A1 | 6/2004 | Takano |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0227809 A1 | 10/2005 | Bitzer et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0193391 A1 | 8/2007 | Armstrong et al. |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039274 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0236319 A1 | 10/2008 | Nichols et al. |
| 2008/0261771 A1 | 10/2008 | Nichols et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0164076 A1 | 6/2009 | Vasiliotis et al. |
| 2009/0251013 A1 | 10/2009 | Vollmer et al. |
| 2009/0280949 A1 | 11/2009 | Lohr |
| 2009/0312145 A1 | 12/2009 | Pohl et al. |
| 2010/0056322 A1 | 3/2010 | Thomassy |
| 2010/0093479 A1 | 4/2010 | Carter et al. |
| 2010/0093485 A1 | 4/2010 | Pohl et al. |
| 2010/0131164 A1 | 5/2010 | Carter et al. |
| 2010/0267510 A1 | 10/2010 | Nichols et al. |

(56) References Cited

U.S. PATENT DOCUMENTS

| | | | |
|---|---|---|---|
| 2011/0088503 A1 | 4/2011 | Armstrong et al. |
| 2011/0105274 A1 | 5/2011 | Lohr et al. |
| 2011/0127096 A1 | 6/2011 | Schneidewind |
| 2011/0172050 A1 | 7/2011 | Nichols et al. |
| 2011/0184614 A1 | 7/2011 | Keilers et al. |
| 2011/0218072 A1 | 9/2011 | Lohr et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0035016 A1 | 2/2012 | Miller et al. |
| 2012/0043841 A1 | 2/2012 | Miller |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0095977 A1 | 4/2013 | Smithson et al. |
| 2013/0102434 A1 | 4/2013 | Nichols et al. |
| 2013/0146406 A1 | 6/2013 | Nichols et al. |
| 2013/0152715 A1 | 6/2013 | Pohl et al. |
| 2013/0190123 A1 | 7/2013 | Pohl |
| 2013/0288844 A1 | 10/2013 | Thomassy |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0331218 A1 | 12/2013 | Lohr et al. |
| 2013/0337971 A1 | 12/2013 | Kostrup |
| 2014/0011619 A1 | 1/2014 | Pohl et al. |
| 2014/0011628 A1 | 1/2014 | Lohr et al. |

FOREIGN PATENT DOCUMENTS

| | | |
|---|---|---|
| CN | 1157379 A | 8/1997 |
| CN | 1281540 A | 1/2001 |
| CN | 1283258 | 2/2001 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 A | 5/2000 |
| DE | 10155372 A1 | 5/2003 |
| EP | 0 432 742 | 12/1990 |
| EP | 0 528 381 | 2/1993 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1 433 641 | 6/2004 |
| EP | 1 624 230 | 2/2006 |
| EP | 1 811 202 | 7/2007 |
| FR | 620375 | 4/1927 |
| FR | 2460427 | 1/1981 |
| FR | 2590638 | 5/1987 |
| FR | 2909938 | 6/2008 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 42-2844 | 2/1967 |
| JP | 47-000448 | 7/1972 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | 56-047231 | 4/1981 |
| JP | 56-127852 | 10/1981 |
| JP | 58065361 | 4/1983 |
| JP | 59069565 | 4/1984 |
| JP | 59-144826 | 8/1984 |
| JP | 60-247011 | 12/1985 |
| JP | 61-031754 | 2/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63219953 | 9/1988 |
| JP | 63-160465 | 10/1988 |
| JP | 01-308142 | 12/1989 |
| JP | 02157483 | 6/1990 |
| JP | 02271142 | 6/1990 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 6-50358 | 2/1994 |
| JP | 7-42799 | 2/1995 |
| JP | 7-139600 | 5/1995 |
| JP | 08170706 A | 7/1996 |
| JP | 09024743 A | 1/1997 |
| JP | 09-089064 | 3/1997 |
| JP | 10-115356 | 5/1998 |
| JP | 10-194186 | 7/1998 |
| JP | 411063130 | 3/1999 |
| JP | 11-257479 | 9/1999 |
| JP | 2000-46135 | 2/2000 |
| JP | 2001-27298 | 1/2001 |
| JP | 2001-107827 | 4/2001 |
| JP | 2001-165296 | 6/2001 |
| JP | 2001521109 A | 11/2001 |
| JP | 2002-147558 | 5/2002 |
| JP | 2002-250421 | 6/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004162652 A | 6/2004 |
| JP | 8-247245 | 9/2004 |
| JP | 2004-526917 | 9/2004 |
| JP | 2005/240928 A | 9/2005 |
| JP | 2006015025 | 1/2006 |
| JP | 2006-300241 | 11/2006 |
| JP | 2007-535715 | 12/2007 |
| JP | 2008-002687 | 1/2008 |
| JP | 2008-285028 | 11/2008 |
| JP | 03-149442 | 1/2009 |
| JP | 2010069005 | 4/2010 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 360184 | 6/1999 |
| TW | 512211 | 12/2002 |
| TW | 582363 | 4/2004 |
| TW | 590955 | 6/2004 |
| TW | 1225129 | 12/2004 |
| TW | 1225912 | 1/2005 |
| TW | 1235214 | 1/2005 |
| TW | M294598 | 7/2006 |
| TW | 200637745 | 11/2006 |
| WO | WO 99/20918 | 4/1999 |
| WO | WO 01/73319 | 10/2001 |
| WO | WO 03100294 | 12/2003 |
| WO | WO 2004-097264 | 11/2004 |

(56) References Cited

FOREIGN PATENT DOCUMENTS

| | | |
|---|---|---|
| WO | WO 2005/083305 | 9/2005 |
| WO | WO 2006/091503 | 8/2006 |
| WO | WO 2007/077502 | 7/2007 |
| WO | WO 2008/002457 | 1/2008 |
| WO | WO 2008/057507 | 5/2008 |
| WO | WO 2008/078047 | 7/2008 |
| WO | WO 2008/095116 | 8/2008 |
| WO | WO 2008/100792 | 8/2008 |
| WO | WO 2008/101070 | 8/2008 |
| WO | WO 2008/131353 | 10/2008 |
| WO | WO 2008/154437 | 12/2008 |
| WO | WO 2009/006481 | 1/2009 |
| WO | WO 2009/148461 | 12/2009 |
| WO | WO 2009/157920 | 12/2009 |
| WO | WO 2010/017242 | 2/2010 |
| WO | WO 2010/135407 | 11/2010 |
| WO | WO 2011/101991 | 8/2011 |
| WO | WO 2013/112408 | 8/2013 |

OTHER PUBLICATIONS

International Search Report and Written Opinion dated Jul. 2, 2012 for PCT Application No. PCT/US2012/031884.

* cited by examiner

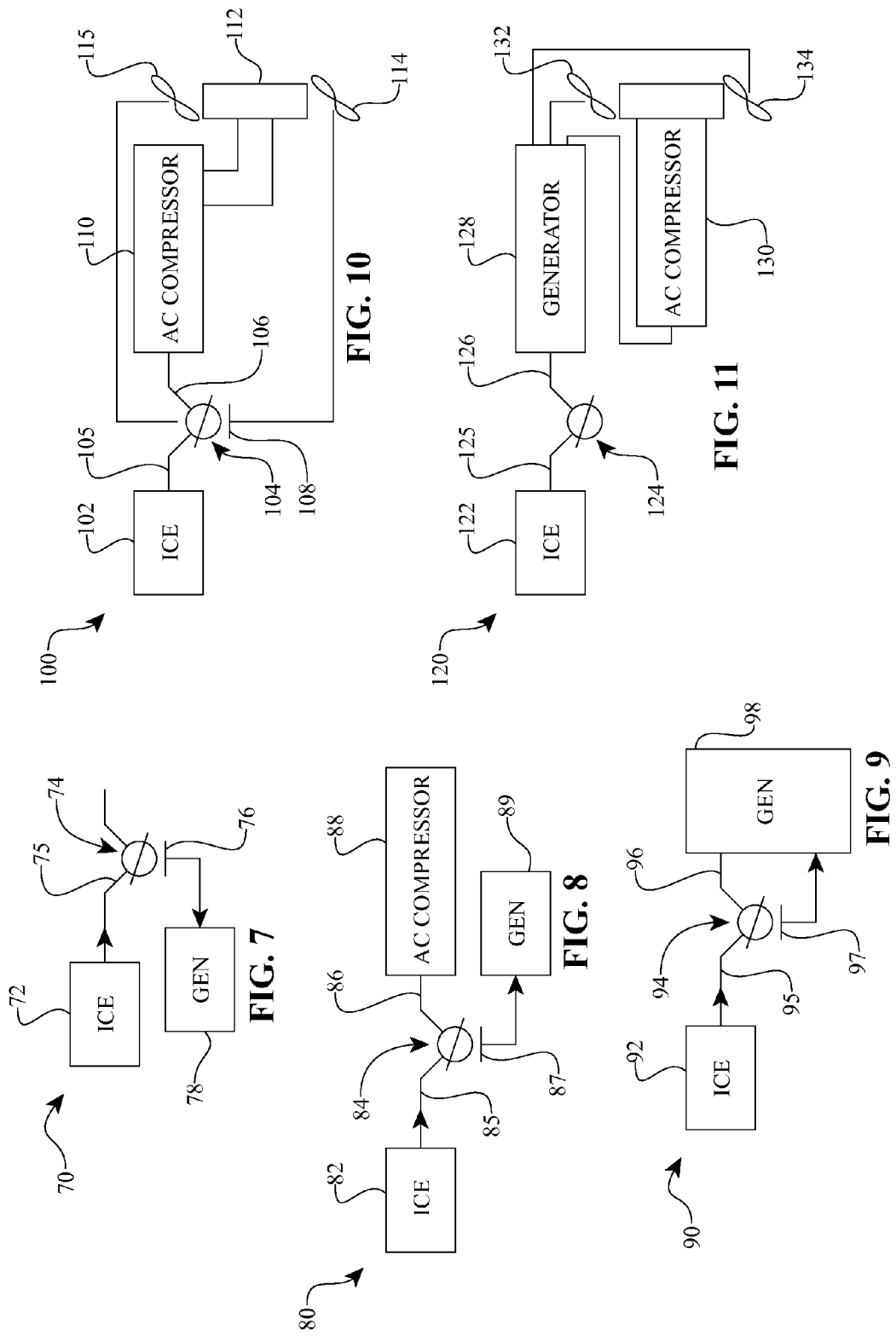

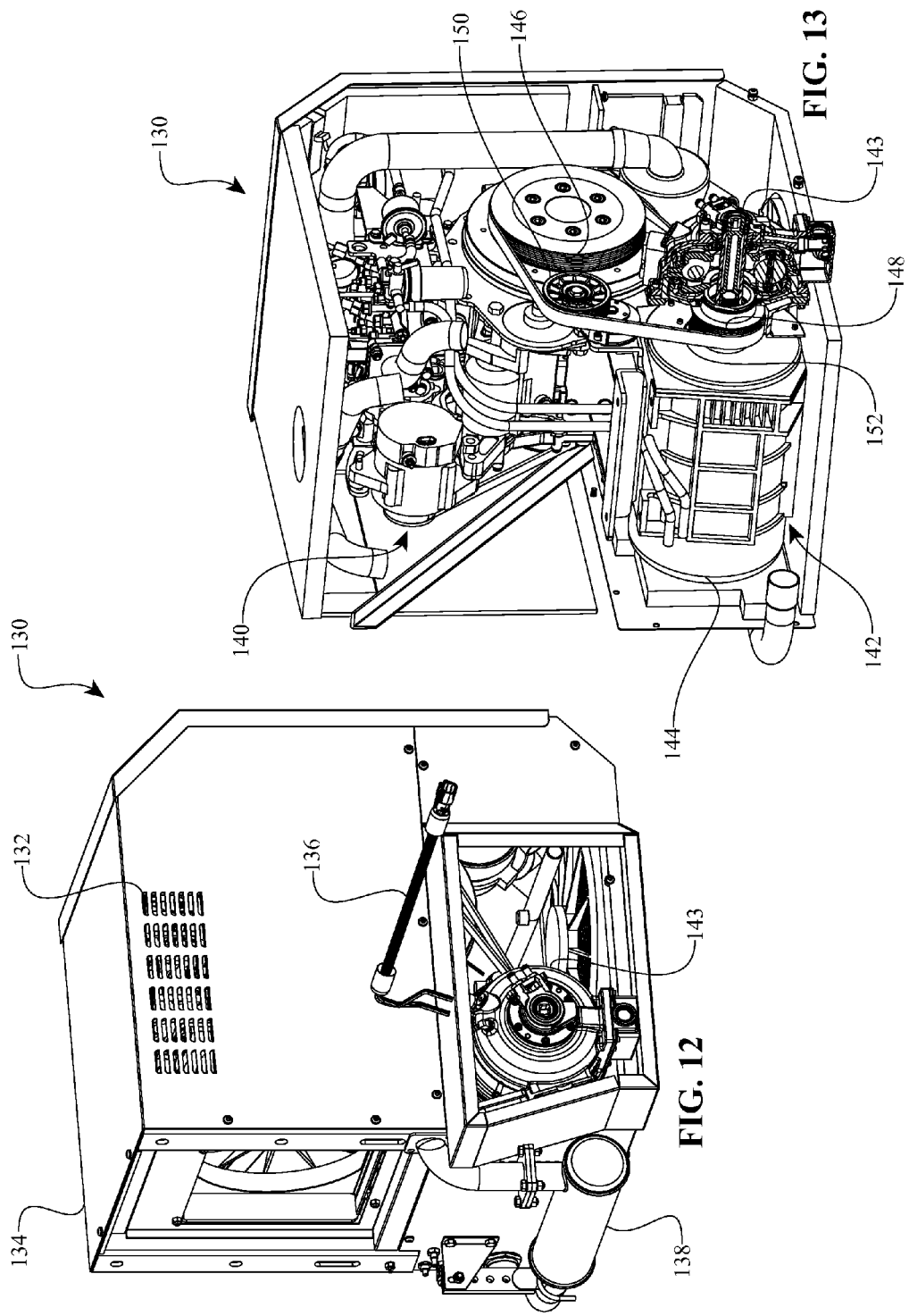

AUXILIARY POWER UNIT HAVING A CONTINUOUSLY VARIABLE TRANSMISSION

RELATED APPLICATION

This application claims the benefit of U.S. Provisional Application No. 61/471,585, filed on Apr. 4, 2011, which is hereby incorporated by reference in its entirety.

BACKGROUND

1. Field of the Invention

This disclosure relates generally to mechanical and/or electro-mechanical power modulation devices and methods, and more particularly to continuously and/or infinitely variable, planetary power modulating devices and methods for providing auxiliary air conditioning, heating, and power to a vehicle.

2. Description of the Related Art

Auxiliary power units are often used in cross-country trucks that are equipped with a sleeper compartment located behind a truck cab so that the driver has a convenient place to sleep while in route. An Auxiliary Power Unit (APU) allows the driver to use its truck amenities like heat, air conditioning, microwave, television, etc. without running the engine, which reduces emissions. See, for example, U.S. Pat. No. 5,333,678 to Mellum. APUs are also used extensively in refrigerated trailers for maintaining cargo temperatures during transport and delivery.

APUs have become significantly more important in the heavy duty trucking industry because the Environmental Protection Agency (EPA) and the California Air Resource Board (CARB) have been developing and passing regulations that impact idling in an attempt to reduce emissions and pollution. The passage of these different regulations has impacted the trucking industry. In particular, it has affected the heavy duty (Class 8) sleeper tractor drivers who typically idle their vehicle for many hours each day. It is estimated that drivers are on the road five days per week. The federal law states that drivers are only allowed to be on the road a maximum of 14 hours a day with 10 hours down time required. Therefore, the sleeper cab industry has a large potential for APUs to reduce idling during the required downtime. Over half of the states in the U.S. have anti-idling regulations in place, and this number is projected to increase as more states adopt CARB regulations. Beyond the numerous federal and state regulations against idling, the industry is also facing idling regulations at the local and municipal levels as well. While their regulations vary by location, they all prohibit trucks from idling over three to five minutes. Some industry experts believe that the environmental agencies are gaining momentum in their initiative to put more pressure on the Federal government as well as on states to make the idling regulations even more stringent in the coming years. If the environmental agencies succeed, some form of anti-idling technology (not just APUs) will become a necessity for truck drivers expanding beyond Class 8 sleeper tractors.

The rise and fall of diesel fuel prices continues to play a role in the adoption of idle reduction technology as users (particularly fleets) seek to lower their fuel consumption especially when diesel prices are high. When diesel fuel prices reached an all time high in 2008, demand for idle reduction technology increased because of the roughly 8% fuel savings they offer. In the long run, most industry experts expect diesel fuel prices to rise, which will again spark interest in APUs as they help to reduce fuel consumption as well as reducing wear and tear on the engine.

In most commercially available APU systems, a single power source drives multiple devices. The power source typically has a narrow operating speed range at which the performance of the power source is optimum. It is preferred to operate the power source within its performance optimizing operating speed range. A driven device typically also has a narrow operating speed range at which the performance of the driven device is optimum. It is also preferred to operate the driven device within its performance optimizing operating speed range. A coupling is usually employed to transfer power from the power source to the driven device. Where a direct, non-modulating coupling couples the power source to the driven device, the driven device operates at a speed proportional to that of the power source. However, it is often the case that the optimum operating speed of the driven device is not directly proportional to the optimum operating speed of the power source. Therefore, it is preferred to incorporate into the system a coupling adapted to modulate between the speed of the power source and the speed of the driven device.

Couplings between the power source and the driven devices can be selected such that the input speed from the power source is reduced or increased at the output of a given coupling. However, in frequently implemented systems, typical known power train configurations and/or coupling arrangements allow at best for a constant ratio between the input speed from the power source and the speed of power transfer to the driven device. The result of such system configuration is that often any given accessory does not operate within its maximum efficiency speed range. Consequently, inefficiencies arise from wasted energy during operation and over sizing of the accessories to handle the speed and/or torque ranges.

Thus, there exists a continuing need for devices and methods to modulate power transfer between a prime mover and driven devices. In some APU systems, it would be beneficial to regulate the speed and/or torque transfer from an internal combustion engine to one or more driven devices that operate at varying efficiency optimizing speeds. The inventive embodiments of power modulating devices and/or drivetrains described below address one or more of these needs.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Embodiments" one will understand how the features of the system and methods provide several advantages over traditional systems and methods.

One aspect of the disclosure relates to a method of controlling an auxiliary power unit having an engine, a generator, and a continuously variable transmission (CVT) coupled to the engine and the generator. In one embodiment, the method includes sensing a change in a load on the generator. The method also includes adjusting the engine to correspond to said change in load and adjusting the speed ratio of the CVT substantially simultaneously with the adjustment of the engine.

Another aspect of the disclosure concerns an auxiliary power unit (APU) with a combustion engine having an engine control system adapted to operate the engine at a requested condition. The APU can have a continuously variable transmission (CVT). The CVT has a set of tiltable balls. The CVT is operably coupled to the engine. The CVT has a CVT control system in communication with the engine control system. In one embodiment, the APU has a generator operably coupled to the CVT. The generator is configured to operate at substantially a constant speed. In one embodiment, the CVT control system is adapted to sense a change in speed of the generator and adjust the CVT based at least in part on said change in speed.

Yet another aspect of the disclosure concerns a method of controlling an auxiliary power unit (APU) that has an engine, a generator, and a continuously variable transmission (CVT) coupled to the engine and the generator. In one embodiment, the method includes determining a change in load based at least in part on a signal from an accessory. The method can also include adjusting the engine to correspond to said change in load and adjusting the speed ratio of the CVT substantially simultaneously with the adjustment of the engine.

Another aspect of the disclosure concerns a control system for an auxiliary power unit (APU) that has an engine, a generator, and a ball-type continuously variable transmission. In one embodiment, the control system includes Cabin Control Unit (CCU) adapted as a user interface to the APU. The control system has an engine control module (ECM) configured to facilitate communication with the CCU and a transmission control unit (NCU). In one embodiment, the ECM can control all HVAC loads, engine pump, sensors, etc. In some embodiments, the transmission control unit (NCU) is adapted to communicate with the ECM and an AC Power Module. The NCU can control an engine variable solenoid and a shift actuator for the CVT. In yet other embodiments, the control system can include an AC Power Module that is configured to read an AC current and voltage and computes the "real" power. The computed power information is passed to the NCU to compute the optimum engine speed.

Yet another aspect of the disclosure concerns an auxiliary power unit having an engine and a generator. In one embodiment, a ball-type continuously variable transmission is coupled to the generator. A pulley assembly can provide a coupling between the engine and the transmission. In some embodiments, the ball-type continuously variable transmission is provided with a skew-based control system. The skew-based control system can have an actuator in communication with an APU control system. The APU control system can include a number of sensors. In some embodiments, the sensors include speed sensors adapted to provide an indication of engine speed, generator speed, transmission speed. In other embodiments, the sensors can include temperature sensors adapted to provide an indication of engine temperature and transmission temperature. In one embodiment, the APU control system coordinates the operation of the transmission and engine to maintain a constant generator speed.

One more aspect of the disclosure concerns a method for minimizing the fuel consumption of an auxiliary power unit having a continuously variable transmission (CVT). In one embodiment, the method includes the step of providing a computational model (such as the model presented in Equations 1-9 in this document). The method has the step of determining the engine torque and speed as a function of the generator speed and electrical. The method includes the step of performing a regression to determine the fuel consumption rate. In some embodiments, a speed ratio of the CVT is computationally swept from the minimum ratio to the maximum ratio to thereby compute multiple fuel consumption values. For a given generator power demand, the CVT speed ratio can be selected to thereby yield the minimum fuel consumption value. This process can be repeated for increasing electrical power demands to thereby generate a fuel consumption relationship to electrical power demand.

BRIEF DESCRIPTION OF THE FIGURES

FIG. 7 is a schematic illustration of an APU having a ball-type CVT.

FIG. 8 is a schematic illustration of an APU having a ball-type CVT.

FIG. 9 is a schematic illustration of an APU having a ball-type CVT.

FIG. 10 is a schematic illustration of an APU having a ball-type CVT.

FIG. 11 is a schematic illustration of an APU having a ball-type CVT.

FIG. 12 is a perspective view of one embodiment of an APU.

FIG. 13 is a cut away perspective view of the APU of FIG. 12.

DETAILED DESCRIPTION OF CERTAIN EMBODIMENTS

Figure 1:
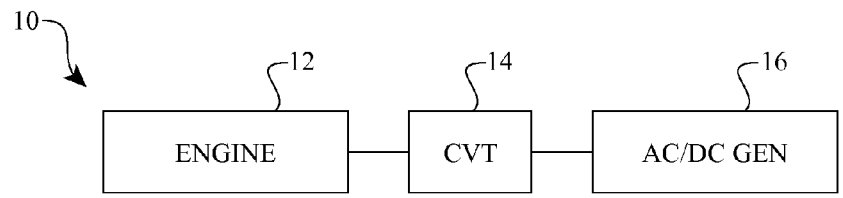
FIG. 1 is a schematic illustration of one embodiment of an auxiliary power unit (APU).
Figure 2:
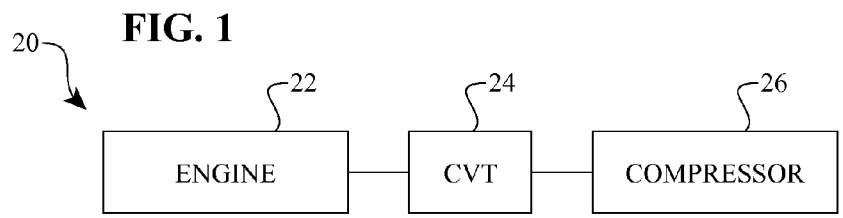
FIG. 2 is a schematic illustration of an embodiment of an APU.
Figure 3:
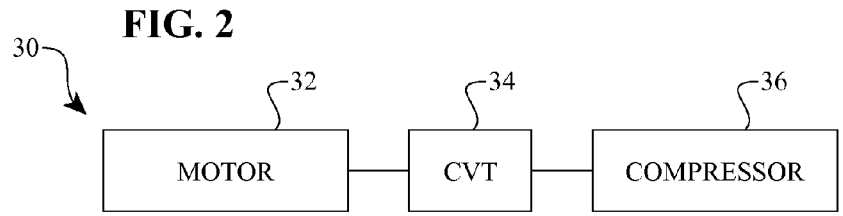
FIG. 3 is a schematic illustration of an embodiment of an APU.
Figure 4:
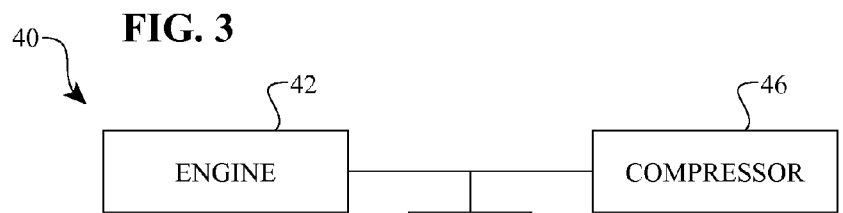
FIG. 4 is a schematic illustration of an embodiment of an APU.
Figure 5:
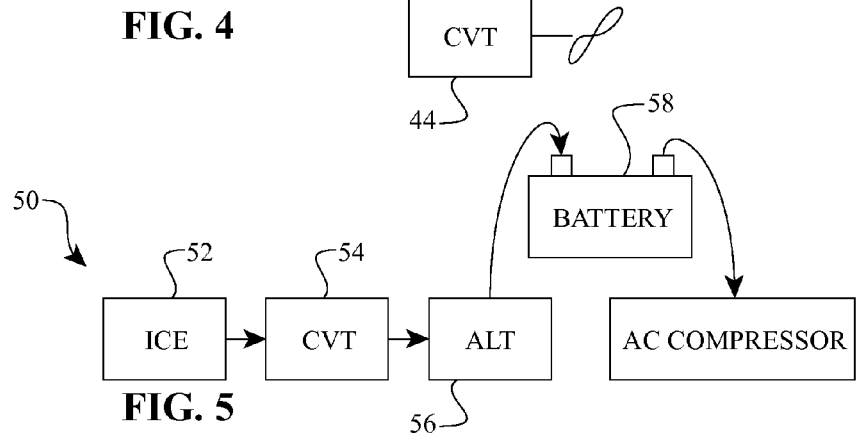
FIG. 5 is a schematic illustration of an embodiment of an APU.
Figure 6:
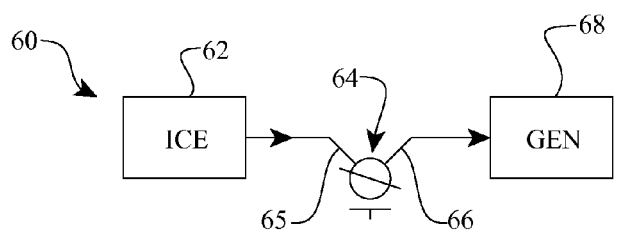
FIG. 6 is a schematic illustration of an APU having a ball-type CVT.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments. Furthermore, embodiments of the disclosure can include several novel features, no single one of which is solely responsible for its desirable attributes or which is essential to practicing the embodiments described. Certain CVT embodiments described here are generally related to the type disclosed in U.S. Pat. Nos. 6,241,636; 6,419,608; 6,689,012; 7,011,600; 7,166,052; U.S. patent application Ser. Nos. 11/243,484; 11/543,311; 12/198,402; 12/251,325 and Patent Cooperation Treaty patent applications PCT/US2007/023315, PCT/IB2006/054911, PCT/US2008/068929, and PCT/US2007/023315, PCT/US2008/074496. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "axial" as used here refers to a direction or position along an axis that is parallel to a main or longitudinal axis of a transmission or variator. The term "radial" is used here to indicate a direction or position that is perpendicular relative to a longitudinal axis of a transmission or variator. For clarity and conciseness, at times similar components labeled similarly will be referred to collectively by a single label.

Some embodiments disclosed here are related to a CVT using generally spherical planets each having a tiltable axis of rotation that can be adjusted to achieve a desired ratio of input speed to output speed during operation. In one embodiment, adjustment of said axis of rotation involves angular displacement of the planet axis in a first plane in order to achieve an angular adjustment of the planet axis in a second plane, wherein the second plane is substantially perpendicular to the first plane. The angular displacement in the first plane is referred to here as "skew", "skew angle", and/or "skew condition". For discussion purposes, the first plane is generally parallel to a longitudinal axis of the variator and/or the CVT. The second plane can be generally perpendicular to the longitudinal axis. In one embodiment, a control system coordinates the use of a skew angle to generate forces between certain contacting components in the variator that will tilt the planet axis of rotation substantially in the second plane. The tilting of the planet axis of rotation adjusts the speed ratio of the variator.

Other embodiments disclosed here are related to continuously variable transmissions having spherical planets such as those generally described in U.S. Pat. No. 7,125,359 to Milner, U.S. Pat. No. 4,744,261 to Jacobson, U.S. Pat. No. 5,236,403 to Schievelbusch, or U.S. Pat. No. 2,469,653 to Kopp. Some embodiments disclosed here are related to continuously variable transmissions having belts or chains, see for example U.S. Pat. No. 7,396,311 to Gates. Yet other embodiments disclosed here are related to transmissions having toroidal discs for transmitting power. See for example U.S. Pat. No. 7,530,916 to Greenwood and U.S. Pat. No. 6,443,870 to Yoshikawa et al. The entire disclosure of each of these patents and patent applications is hereby incorporated herein by reference.

One aspect disclosed here relates to auxiliary power units wherein a prime mover drives various driven devices. Auxiliary power units disclosed here can be used in various trucking and transport vehicles including, but not limited to, refrigeration trucks, recreational vehicles, buses, locomotives, service vehicles, trash trucks, marine vehicles, Class 3 and Class 8 trucks, among others. The prime mover can be, for example, an electrical motor and/or a combustion engine. For purposes of description here, an accessory includes any machine or device that can be powered by a prime mover. For purposes of illustration and not limitation, said machine or device can be a power takeoff device (PTO), pump, compressor, generator, auxiliary electric motor, etc. Accessory devices configured to be driven by a prime mover may also include refrigeration systems, alternators, water pumps, power steering pumps, fuel pumps, oil pumps, air conditioning compressors, cooling fans, superchargers, turbochargers and any other device that is typically powered by a prime mover. Embodiments disclosed here can be used to control the power delivered to the accessories powered by a prime mover.

Referring now to FIGS. 1-5, in one embodiment, an APU 10 can include an engine 12 operably coupled to a CVT 14. The CVT 14 can be operationally linked to a generator 16. In some embodiments, an APU 20 can include an engine 22 operably coupled to a CVT 24. The CVT 24 can be operably connected to a compressor 26. The compressor 26 can be used, for example, in an air conditioning system. In other embodiments, an APU 30 can include an electric motor 32 operably coupled to a CVT 34. The CVT 34 can be operationally coupled to a compressor 36. In yet other embodiments, an APU 40 can include an engine 42 operably coupled to a CVT 44. The engine 42 can be operably coupled to, for example, a compressor 46. In one embodiment, an APU 50 can include an internal combustion engine 52 operationally coupled to a CVT 54. The CVT 54 can be operably connected to, for example, an alternator 56. The alternator 56 electrically couples to a battery 58. The battery 58 can be used to power, for example, an electric compressor 59. It should be noted that couplings between elements described can be achieved through linkages that can include gearing or pulleys with ratios as appropriate to achieve the desired operating speed for components.

Turning now to FIGS. 6-9, in one embodiment, an APU 60 includes an internal combustion engine 62 coupled to a CVT 64. The CVT 64 can be, for example, a ball-type CVT having an input ring 65 and an output ring 66. The engine 62 can be operably coupled to the input ring 65. The output ring 66 can be operably connected to, for example, a generator 66. In some embodiments, an APU 70 can include an internal combustion engine 72 coupled to a CVT 74. The CVT 74 can be, for example, a ball-type CVT having an input ring 75 and a rotatable support member 76. In one embodiment, the rotatable support member 76 can be configured to deliver a power to, for example, a generator 78. In other embodiments, an APU 80 can include an internal combustion engine 82 coupled to a CVT 84. The CVT 84 can be, for example, a ball-type CVT having an input ring 85, an output ring 86, and a rotatable support member 87. The input ring 85 can be configured to receive a rotational power from the engine 82. The output ring 86 can be coupled to, for example, a compressor 88. The rotatable support member 87 can be operably connected to, for example, a generator 89. In yet other embodiments, an APU 90 can include an internal combustion engine 92 coupled to a CVT 94. The CVT 94 can be, for example, a ball-type CVT having an input ring 95, an output ring 96, and a rotatable support member 97. The output ring 96 can be operably coupled to, for example, a generator 98. The rotatable support member 97 can be operably coupled to the generator 98.

Referring now to FIG. 10, in one embodiment, an APU 100 can include an internal combustion engine 102 operably coupled to a CVT 104. The CVT 104 can be, for example a ball-type CVT having an input ring 105, an output ring 106, and a rotatable support member 108. The engine 102 can be coupled to the input ring 105. The output ring 106 can be operationally coupled to, for example, an air conditioning compressor 110. The air conditioning compressor 110 can be operably linked to, for example, a heat exchanger 112. In one embodiment, the support member 108 can be coupled to a fan 114. In other embodiments, a second fan 115 can be coupled to other rotating components of the CVT 104.

Passing now to FIG. 11, in one embodiment, an APU 120 can include an internal combustion engine 122 operably coupled to a CVT 124. The CVT 124 can be, for example, a ball-type CVT having an input ring 125 and an output ring 126. The input ring 125 can be configured to receive a rotational power from the engine 122. The output ring 126 can be coupled to a generator 128. The generator 128 can be configured to drive, either electrically or mechanically, an air conditioning compressor 130. In some embodiments, the generator 128 can be coupled to a set of fans 132. The fans 132 can be configured to cooperate with, for example, a heat exchanger 134.

Referring now to FIGS. 12 and 13, in one embodiment, an APU 130 is provided with an enclosure 132 configured to mount, for example, on a truck or trailer. The enclosure 132 can have a number of vent openings 134 distributed about the periphery. The vent openings 134 provide ventilation to internal components of the APU 130. The enclosure 132 can be configured for removal of one or more portions to facilitate access to internal components. In some embodiments, the APU 130 has a cooling system 138 mounted on the exterior of the enclosure 132. The cooling system 138 can be in fluid communication with, for example, an engine 140. The engine 140 can be mounted on the interior of the enclosure 132. In one embodiment, the APU 140 includes a continuously variable accessory drive (CVAD) 142 can include a CVT 143 coupled to an alternator/generator 144. The CVAD 142 receives rotational power from an engine driven pulley 146 coupled to an input pulley 148. In some embodiments, the cooling system 138 can be adapted to cooperate with the CVAD 142. In some embodiments, a tensioner pulley 150 can be provided to maintain tension on a drive belt 152.

During operation of the APU 130, a change in an electrical load on the system can be more efficiently accommodated by appropriately adjusting the operating condition of the engine 140. Since the generator 144 performs most efficiently at a fixed speed condition, the CVT 143 can be adjusted to maintain the operating speed of the generator 144 in the presence of a variation in the speed of the engine 140. Coordination and control of the APU 130 will now be discussed as an illustrative example.

Figure 14:
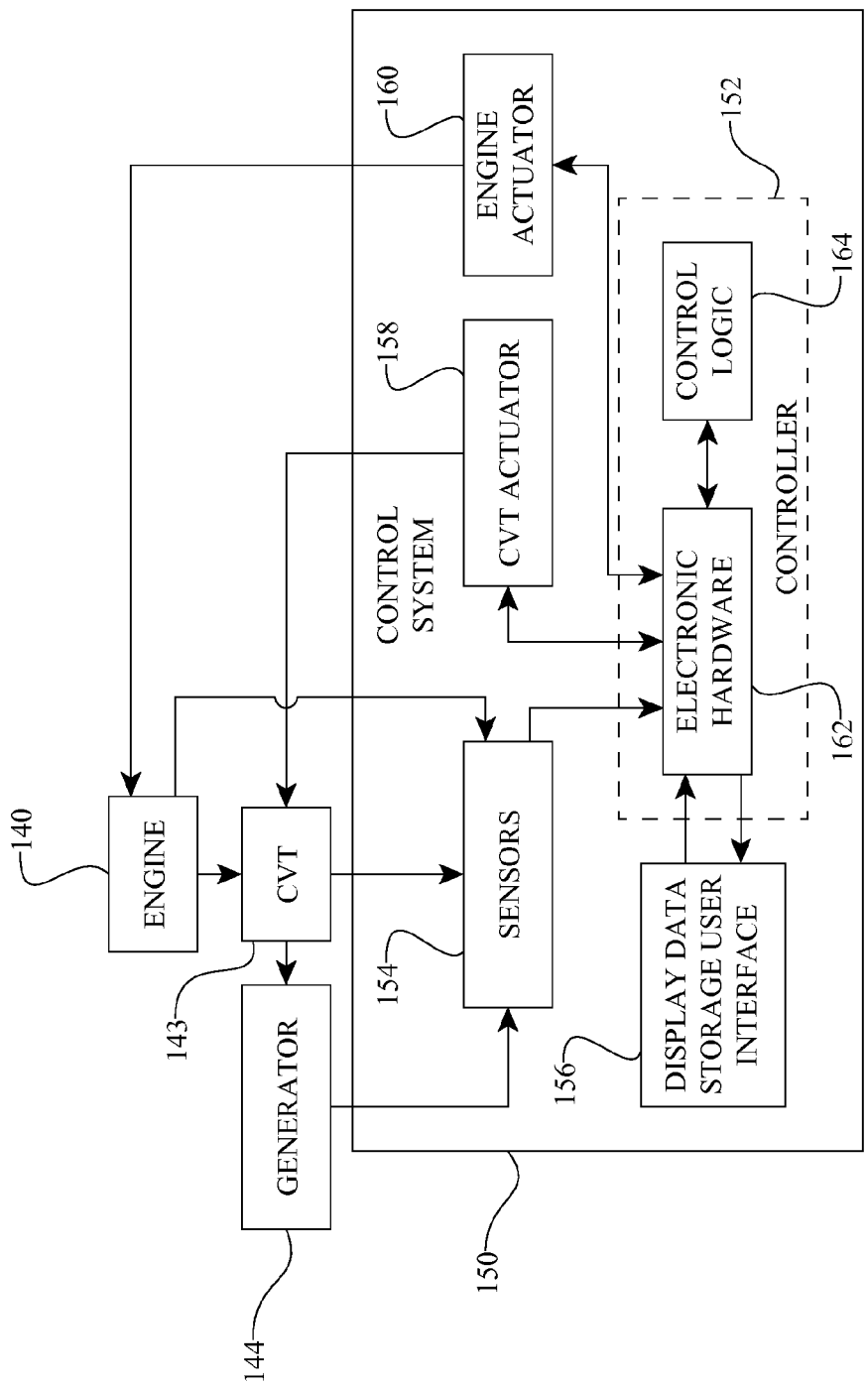
FIG. 14 is a block diagram of an APU having a control system.

FIG. 14 illustrates one embodiment of a control system 150 that can be used with, for example, the APU 130. For description purposes, the engine 140, the CVT 143, and the generator 144 are depicted as blocks in FIG. 14. In one embodiment, the control system 150 includes a controller 152 in communication with sensors 154, a data display and user interface 156, a CVT actuator 158, and an engine actuator 160. The CVT actuator 158 can be operably coupled to the CVT 143 to thereby facilitate adjustment in the operating condition of the CVT 143. The engine actuator 160 can be operably coupled to the engine 140 to thereby facilitate a change in operating condition of the engine 140. In one embodiment, the controller 152 includes electronic hardware 162 in communication with control logic 164. In some embodiments, the sensors 154 are adapted to sense conditions of the engine 140, the CVT 143, and/or the generator 144. For example, the sensors 154 can sense engine speed, CVT input speed, CVT output speed, generator speed, generator voltage, generator current, engine temperature, CVT temperature, and many other variables common to operating an engine, CVT, and/or generator. In some embodiments, the data display and user interface 156 can be mounted on the enclosure 132, for example. In other embodiments, the data display and user interface 156 can be remotely mounted, for example.

Figure 15:
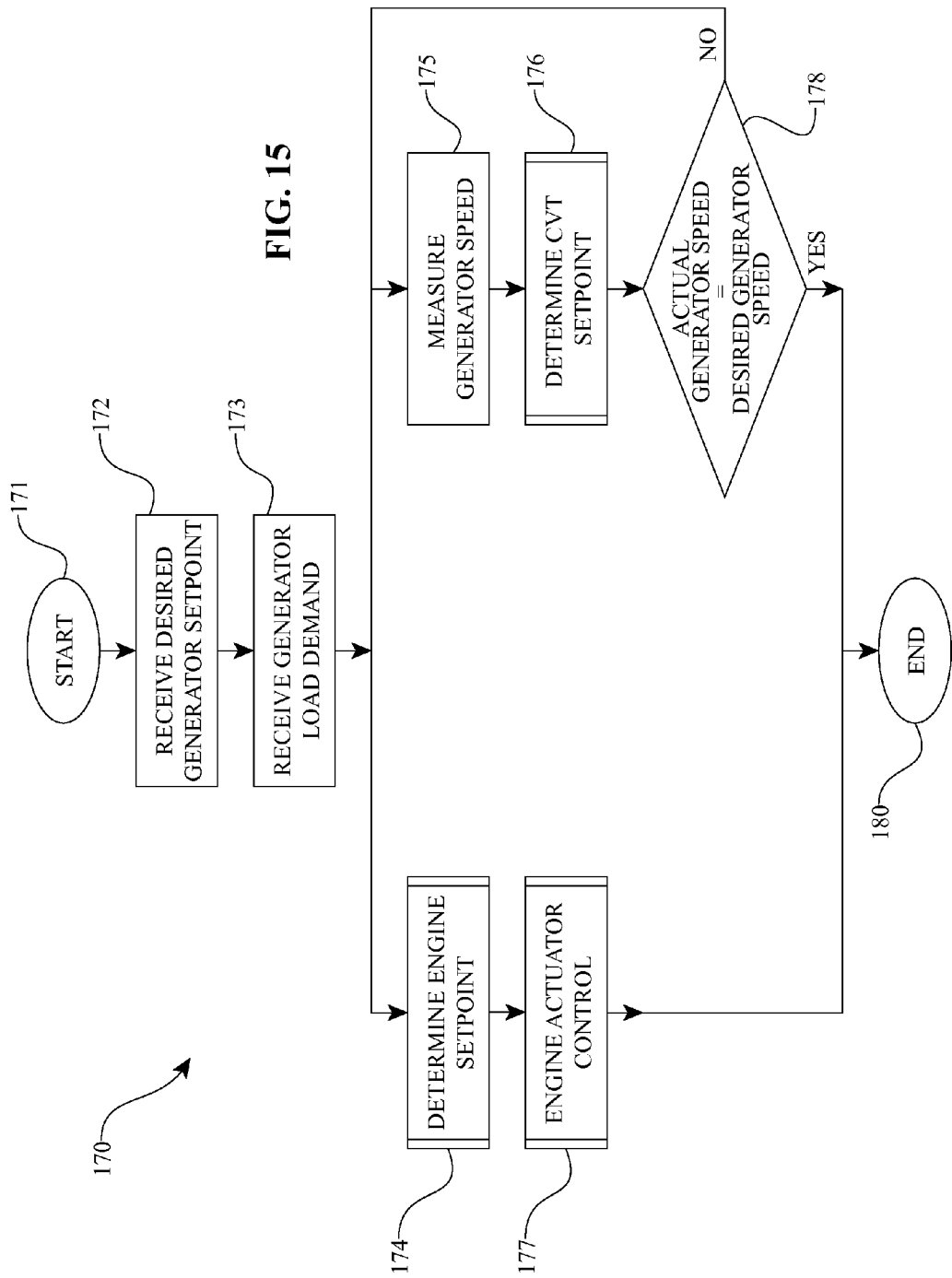
FIG. 15 is a flow chart of a control process that can be used with the APU of FIG. 14.

Turning to FIG. 15, in one embodiment, a control process 170 can be implemented in the control system 150, for example. The control process 170 can begin at block 171 and proceed to a block 172 where a desired generator speed is received. The process 170 moves to a block 173 where a load demand for the generator 144 is received. In one embodiment, the load demand for the generator 144 can be determined from measured parameters such as RMS voltage and RMS current. In other embodiments, the load demand for the generator 144 can be inferred from other parameters. The control process 170 proceeds to a block 174 where a determination is made for the set point of the engine 140. In one embodiment, the speed of the engine is used as a set point. In some embodiments, a throttle position can be used as a set point. In other embodiments, a fuel rate can be used as a set point. The control process 170 proceeds to a block 175 where the speed of the generator 144 is measured. The control process 170 proceeds to a block 176 where the set point for the CVT 143 is determined. In one embodiment, the set point for the CVT 143 can be a speed ratio. In some embodiments, the set point for the CVT 143 can be an output speed. In other embodiments, the set point for the CVT 143 can be a torque ratio. In yet other embodiments, the set point for the CVT 143 can be an indication of the efficiency of the CVT 143. The process 170 proceeds to a decision block 178 where the measured speed of the generator 144 is compared to the desired speed of the generator 144. If the measure speed and the desired speed are not equal, the control process 170 returns to block 175. If the measured speed and the desired speed are equal, the control process proceeds to the ending state 180. In one embodiment, the control process 170 includes a block 177 where an actuator control process for the engine 140 is executed. The actuator control process can be open loop based on a determined engine set point. In some embodiments, the actuator control process can be a closed loop process based on a desired engine set point compared to a measured engine set point. It should be noted that the control process 170 is configured so that the CVT 143 is adjusted during changes in the operating condition of the engine 140 to maintain steady operation of the generator 144.

Figure 16:
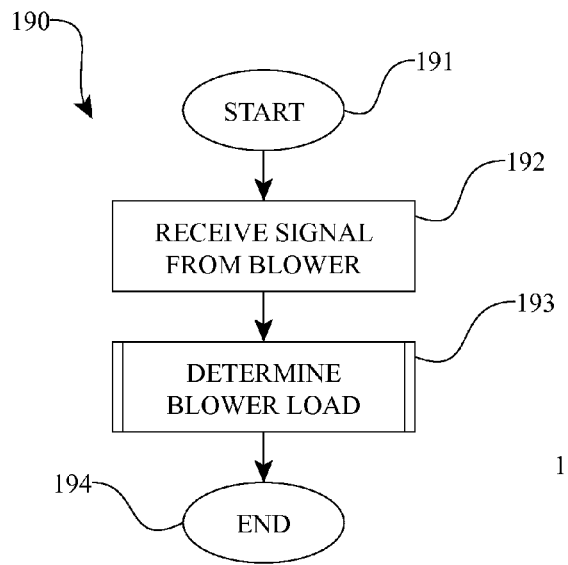
FIG. 16 is a flow chart of a control process that can be used with the control process of FIG. 14.
Figure 17:
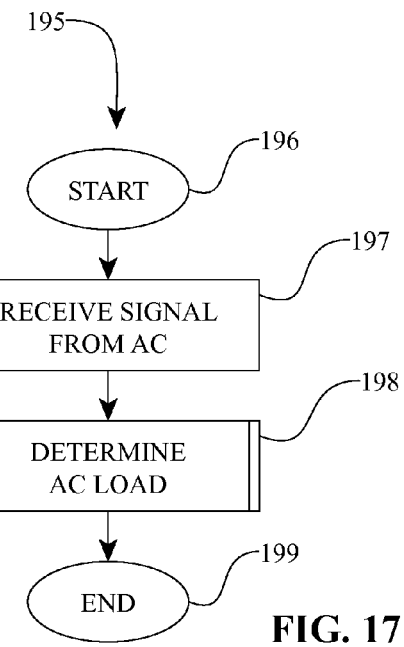
FIG. 17 is a flow chart of a control process that can be used with the control process of FIG. 14.
Figure 18:
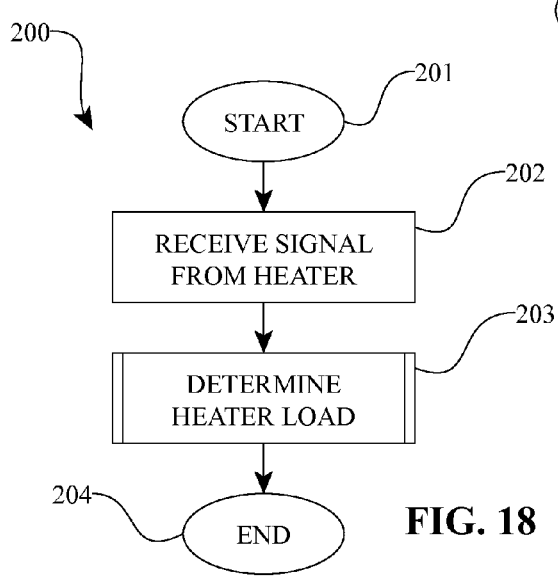
FIG. 18 is a flow chart of a control process that can be used with the control process of FIG. 14.

Referring now to FIGS. 16-18, in one embodiment, receiving a generator load demand in block 173 can include one or more of the processes 190, 195, and 200. In one embodiment, the process 190 begins at block 191 and proceeds to block 192 where a signal from a blower is received. The process 190 proceeds to block 193 where the load from the blower is determined. In some embodiments, a look-up table can be employed to determine the load from the blower. The process 190 ends at block 194. In one embodiment, the process 195 begins at block 196 and proceeds to block 197 where a signal from an air conditioner (AC) is received. The process 195 proceeds to block 198 where the load from the AC is determined. In some embodiments, a look-up table can be employed in block 198. The process 195 ends at block 199. In one embodiment, the process 100 begins at block 201 and proceeds to block 202 where a signal from a heater is received. The process 200 proceeds to block 203 where a load from the heater is determined. In some embodiments, a lookup table is used in block 203. The process 200 ends at block 204.

Those of skill will recognize that the various illustrative logical blocks, modules, circuits, and algorithm steps described in connection with the embodiments disclosed herein, including with reference to the control system 150, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, the controller 152 comprises a processor (not shown).

The embodiments disclosed herein can reduce the fuel consumed by auxiliary power units (APU). For example, a comparison can be made of the fuel rate for a standard APU to a combined APU-CVAD system for various power levels. This is achieved by deriving an inverse relationship between the output torque of the pulley and engine torque. The inverse relationship is derived as follows:

$$\eta_p = (T_p * \omega_p)/(T_E * \omega_E) \quad \text{(Equation 1)}$$

$$\omega_p = p * \omega_E \quad \text{(Equation 2)}$$

Substituting equation (2) into (1) yields:

$$\eta_p = (T_p * p * \omega_E)/(T_E * \omega_E) = (p * T_p)/T_E \quad \text{(Equation 3)}$$

The variable $\eta_p$ represents the pulley efficiency, $\omega_p$ represents the output shaft speed of the stock pulley, $T_p$ represents the output torque of the pulley, $T_E$ represents the output torque of the engine, and p is the pulley ratio. Both $\eta_p$ and p are measured as a function of the input torque $T_E$, therefore equation (3) can be rearranged as follows:

$$T_p = (\eta_p(T_E) * T_E)/(p(T_E)) \quad \text{(Equation 4)}$$

In equation (4), the right hand side is purely a function of the output torque of the engine. Thus, equation 4 can be represented as follows:

$$T_p = f(T_E) \quad \text{(Equation 5)}$$

Therefore, $T_E$ can be calculated from equation 5 inverting the function $f$ as follows:

$$T_E = f^{-1}(T_p) \quad \text{(Equation 6)}$$

The use of the inverted function $f^{-1}$ alleviates the need for an iterative method to the solution. In the case of the stock APU, the output torque of the pulley is determined from the input mechanical torque of the generator, which in turn is determined by the electrical generator power and generator efficiency as follows:

$$T_p = P_{GEN}/(\eta_{GEN} * \omega_{GEN}) \quad \text{(Equation 7)}$$

In the case of an APU-CVAD system, the output torque of the pulley is calculated as follows:

$$T_p = P_{GEN}/(\eta_{GEN} * \eta_{CVT} * \omega_p) \quad \text{(Equation 8)}$$

The variable PGEN represents the electrical power demand from the generator, $\eta_{CVT}$ represents the efficiency of the CVT, $\eta_{GEN}$ represents the generator efficiency, and $\omega_{GEN}$ represents the generator operating speed. In some embodiments, the generator operating speed is approximately 3600 rpm. Equation 8 can be simplified to the following:

$$T_p = P_{GEN}/(\eta_{GEN} * \eta_{CVT} * \omega_p) \quad \text{(Equation 9)}$$

Once the output pulley torque is known by using either equation 8 or equation 9, the equation 6 can be used to determine the output torque of the engine, and thereby determine the rate of fuel supply needed by the engine to sustain the power level of the generator. Minimizing the rate of fuel supplied to the engine is preferred.

Figure 19:
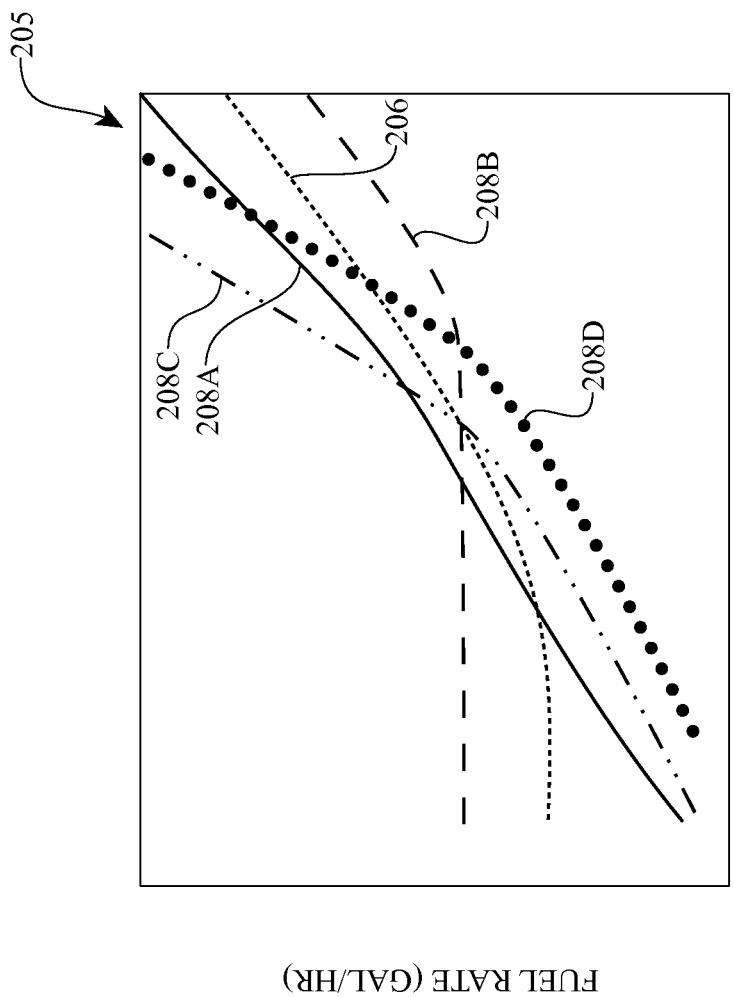
FIG. 19 is a chart depicting performance characteristics of the APU of FIG. 14.

Equations 1-9 can be used to generate the graph 205 depicted in FIG. 19, which illustrates a comparison of the fuel rate versus steady state generator electrical power for a standard APU without a CVT and an APU systems equipped with a CVT (APU-CVT system), such as the APU 130 that is equipped with a CVAD 142. Equations 1-9 represent a computational model for an APU-CVT system. The graph 205 has an x-axis representing power demand from the generator. The graph 205 has a y-axis representing fuel consumption rate of the engine. A curve 206 can represent performance of a standard APU. Curves 208 can represent performance of CVT enabled APU systems. In one embodiment, the curve 206 crosses the curves 208. Therefore, for some electrical power demands from the generator, the standard APU can be more efficient. For other power demands, the APU 130 is significantly more fuel efficient. In some embodiments, the crossover point can be adjusted so that the system performs most efficiently under frequently used operating conditions. It should be appreciated that a designer can adjust the operating efficiency of an APU-CVT system with design choices such as engine size and type, CVT size and type, generator size and type, pulley size and configuration, among others. For example, a designer can select the pulley sizes so that the CVT operates at its most efficient condition for the majority of the duty cycle of the system. In some cases, a duty cycle for an APU system can include conditions of relatively low generator power. In such conditions, the APU-CVT system can be configured so that the CVT operates most efficiently in low power conditions. Likewise, the APU-CVT system can be configured so that the CVT operates most efficiently in high power conditions when deemed suitable for an application. Depending on the cycle, an APU-CVT system such as the APU 130 can be approximately 24% more fuel efficient than a standard APU without a CVT.

It should be noted that the computational model presented in equations 1-9 can be exercised for an APU system. The engine torque and speed can be computed when given the generator speed (sometimes fixed to 3600) and electrical power demand. The fuel consumption rate (FC) for the engine can then be determined via regression, for example FC=f (Engine_Speed,Engine_Torque). This process can be repeated for increasing electrical power demands to get a relationship between fuel consumption and electrical power demand. In other embodiments, the computational model presented in equations 1-9 can be exercised for an APU-CVT system. The engine torque and speed can be determined when given the generator speed and electrical power demand. The fuel consumption rate (FC) can be determined via regression. For APU-CVT systems, the CVT speed ratio is computationally swept from the minimum ratio to the maximum ratio to thereby compute multiple fuel consumption values. For a given generator power demand, the CVT speed ratio can be selected to thereby yield the minimum fuel consumption value. This process can be repeated for increasing electrical power demands to thereby generate a fuel consumption relationship to electrical power demand.

Figure 20:
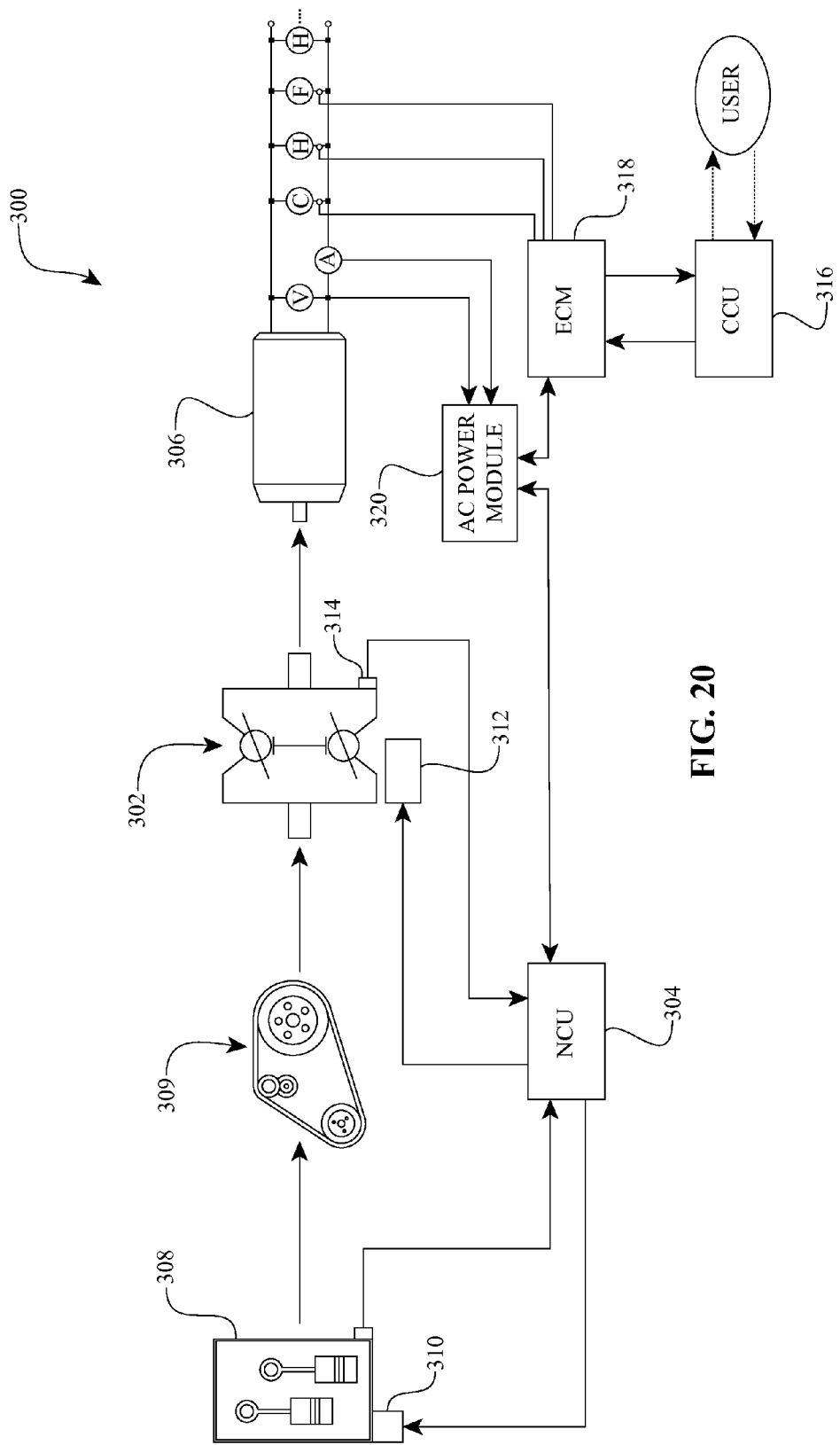
FIG. 20 is a schematic illustration of an APU having a CVT.

Referring now to FIG. 20, in one embodiment, an auxiliary power unit (APU) 300 can include an integrated continuously variable planetary (CVP) transmission 302 and transmission control unit (NCU) 304. The NCU 304 can maintain a near constant speed of a generator 306. For example, the NCU 304 can maintain the generator 306 at 3600-rpm+/−120-rpm (60 Hz+/−2 Hz). The NCU 304 can also be configured to minimize fuel consumption of an engine 308. The engine 308 can be operably coupled to the CVP 302. In some embodiments, the engine 308 is coupled to the CVP 302 with a pulley system 309, for example. In one embodiment, the engine 308 is a Yanmer 2-cylinder 0.5 L 13-hp diesel engine. The engine 308 can be provided with a mechanical fly-ball governor system that is designed to maintain an engine speed based on the position of a fuel solenoid 310. In some embodiments, the solenoid 310 sets the engine "reference" speed and the mechanical governor regulates the engine speed about the reference.

Still referring to FIG. 20, in one embodiment, the CVP 302 enables the engine 308 to operate over a bounded, but continuous, speed range to facilitate fuel optimization. The speed ratio of the CVP 308 can be adjusted using a DC motor based actuator 312. The actuator 312 can be controlled by the NCU 304. In some embodiments, the power output of the CVP 308 is directly coupled to a shaft of the generator 306. A speed sensor 314 is mounted at the output of the CVP 304. The rotor speed of the generator 306 is directly measured by the sensor 314. In one embodiment, the generator is a Markon 6.0-kVA single phase alternator setup for 110-120V at 3600-rpm.

Referring still to FIG. 20, in one embodiment, a cabin control unit (CCU) 316 is the interface that the user interacts with to turn ON/OFF the APU and to enter various control settings (e.g. cabin set temperature). An engine control module (ECM) 318 can be a logic board controlling various relays/switches (e.g. starter relay, glow plug relay, fan relays, HVAC component relays). The ECM 318 can be configured to communicate with the NCU 304 via a CAN communication interface. The ECM 318 can pass information regarding the status of various loads, while the NCU 304 will pass back information regarding the status of the engine speed and various CVP 304 operating conditions.

In one embodiment, the NCU 304 can regulate both the engine speed and the CVP 302 output speed (or possibly the system's effective speed ratio, $\omega_{Gen}/\omega_{Eng}$). To control the engine speed, the NCU 304 will monitor the engine speed and adjust the signal to the fuel solenoid 310 effectively changing the reference speed to the engine 308. Control of the CVP 302 output speed (or system's effective speed ratio) will be achieved by controlling the DC actuator 312 used to shift the CVP. Both speeds can be measured using hall-effect sensors. As mentioned before, the NCU 304 can communicate with the ECM 318 to exchange information on the load status and any diagnostics.

In some embodiments, the NCU 304 can communicate an AC power module 320. The AC power module 320 can measure the power produced by the generator 306. The module 320 uses an IC chip that requires the current and voltage wave forms to properly compute the components of the AC power. In some embodiments, the "real" component of the AC power is of interest. To measure current, a hall-effect transformer can be used, while a series of voltage dividers can be used to measure the AC voltage.

During operation of the APU 300, the control system 304 can regulate the speed of the generator 306 to 3600-rpm+/−120-rpm while minimizing fuel consumption. In one embodiment, a feed-forward or 'predictive' component can be added to the control system 304. The ECM 318 can be configured to control ON/OFF status of most of the major AC loads on the APU 300. The majority of these 'predictive' loads can be given a binary ID, which can be related to a baseline value of the power demand associated with each predictive load. In some embodiments, the feed-forward power values associated with each predictive load will be increased by a certain factor to account for the high transient load due to in-rush current. Before the ECM 318 turns ON a given predictive load, it can send a data packet to the NCU 304. The NCU 304 will then process the data and adjust the engine speed to account for the increase in power demand. Once the speeds of the engine 308 and generator 306 have stabilized, the NCU 304 can send a data packet back to the ECM 318 informing the load is ready to be turned ON.

In some embodiments, it is desirable to minimize fuel economy. The power of the generator 306 can be computed using measurements of both the voltage and current waveforms; thus, accounting for higher order harmonics and phase shift or power factor. Based on a curve relating optimum engine speed to power demand, a "correction" component can be added to the control scheme. The NCU 304 can adjust the engine speed based on the measured power and optimum engine curve. For non-predictive loads (e.g. block heater, microwave, and refrigerator), the response of the APU 300 can be configured to be fast enough to maintain the speed of the generator 306 within the +/−120-rpm tolerance. The majority of non-predictive loads are minor loads.

Figure 21:
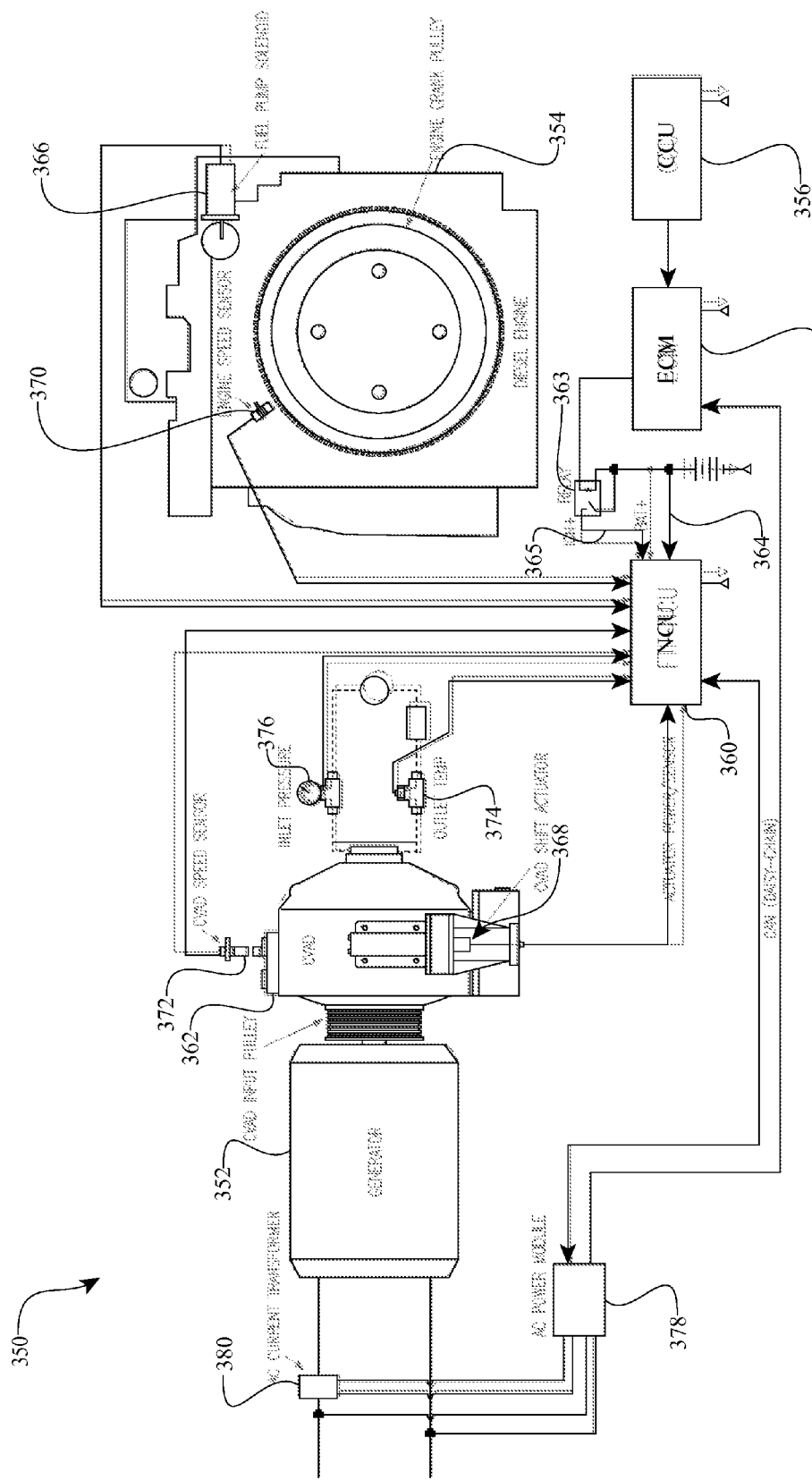
FIG. 21 is another schematic illustration of an APU having a CVT.

Turning now to FIG. 21, in one embodiment, an APU 350 can be provided with a generator 352 that is powered by a 2-cylinder diesel engine 354. The APU 350 can have a control system that includes a cabin control unit (CCU) 356, an engine control module (ECM) 358 and a transmission control unit (NCU) 360. The CCU 356 can be a primary user interface. The ECM 358 monitors and directs the operation of the APU 350. The ECM 358 includes connections to the CCU 356, APU 350, NCU 360, and an HVAC system (not shown). The ECM 358 controls aspects of the APU 350 and HVAC system based on various sensors and direction from the CCU 356 and NCU 360.

Referring still to FIG. 21, in one embodiment, the NCU 360 controls both the speed of the engine 354 and operation of a continuously variable transmission (CVP) 362 based on various sensors and direction from the ECM 358. In some embodiments, a CAN interface can be employed. The NCU 360 can be powered via the vehicle DC battery though two connections. A first connection 364 can be fused and hard-wired to the battery, which is closed via an internal switch inside NCU 360. A second connection 365 can be fused and connected to an external mechanical relay 363 that is controlled by the ECM 358 to turn ON/OFF the NCU 360. During system startup, the ECM 358 can turn ON the NCU 360 via the mechanical relay 363 initiating the NCU 360 into wait mode. When the NCU 360 is turned ON, the first connection 364 will be closed via the internal switch. In a system shutdown, the ECM 358 will open the relay 363 removing power to the second connection 365, which sends the NCU 360 into a shutdown mode. When the NCU 360 shutdown process has ended, the internal switch will open the first connection 364 completely eliminating power to the NCU 360.

In one embodiment, the NCU 360 can control both a fuel pump solenoid 366 and a shift actuator 368 to regulate the engine speed and CVP 362 output speed, respectively. The speed ratio of the CVP 362 is changed by controlling its shift actuator 368. In one embodiment, the shift actuator 368 includes a DC motor based actuator having an 18:1 gear reduction and originally designed to operate an Electric Motor driven Exhaust Gas Recirculation valve (not shown). The shift actuator 368 can include an Acme screw assembly (not shown) with a ⅜"-16 single-start lead. The output of the DC actuator is coupled to the acme screw that is adapted to move the acme nut in a translation motion. The acme nut interacts with a shift clevis, for example, provided on the CVP 362, through a pin-slot arrangement. As the acme screw turns, the nut moves in a translational motion causing the CVP 352 to change ratio.

During operation of the APU 350, the speed ratio of the CVP 362 is directly related to the shift angle of a stator provided on CVP 362. In some embodiments, the CVP 362 can be of the type described in U.S. patent application Ser. No. 12/251,325. During certain operating conditions, the CVP 362 is loaded and the speed ratio can change due to such factors as slip and compliance. The NCU 360 is adapted to compensate for ratio change under load. Mechanical shift stops can be installed onto the stator of the CVO 362 to facilitate the limits of the shift range of the CVP 362. In some embodiments, the CVP 362 has a ratio in the range of 0.5 to 1.75 under rated load. The range can corresponds to about 6 mm of total linear travel of the acme nut or about 4 rotations of the acme screw. During operation, the NCU 360 can shift the stator between the mechanical shift stops without jamming against them.

During shutdown of the APU 350, the NCU 360 can re-zero the CVP 362. A re-zero event consists of moving the actuator 368 quickly to under-drive (for example, a speed ratio of 0.5) while the CVP 362 is coming to a stop, but still rotating. In one embodiment, this operating condition is achieved by moving the actuator 368 towards the under-drive shift stop and monitoring the DC actuator position sensor to see when the under-drive shift stop is contacted. Once contact is detected, the acme screw is moved about an ⅛ of a revolution in the opposite direction to come off the shift stop. In other embodiments, the operating condition is achieved by using the DC actuator position sensor to measure the absolute position of the acme screw. During a shutdown, the NCU 360 puts the actuator 368 at the position corresponding to under-drive.

Still referring to FIG. 21, in one embodiment, the speed of the engine 354 is set by controlling the variable fuel pump solenoid 366. The NCU 360 monitors engine speed with, for example, a speed sensor 370. The NCU 360 can use closed loop feedback control to regulate the solenoid 366 to a desired set point. In some embodiments, the NCU 360 receives signals from the engine speed sensor 370 and a CVP speed sensor 372. The CVP speed sensor 372 is adapted to indicate the output speed of the CVP 362. In some embodiments, the output speed of the CVP 362 corresponds to the speed of the generator 352. The speed sensors 370, 372 can be open collector with sinking output and require an external pull-up resistor. In some embodiments, the DC actuator 368 has an integrated rotator Tri-axis Hall sensor. The output of the said sensor is ratiometric and programmable.

During operation of the APU 359, the NCU 360 can monitor an oil outlet temperature of the CVP 362 using a NTC engine coolant temperature (ETC) sensor 374. If the temperature exceeds a certain range limit for a specified amount of time, the NCU 360 can issue a shutdown command to the ECM 358. The NCU 360 can monitor an oil inlet pressure of the CVP 362 using a pressure sensor 376. If the pressure exceeds a certain range limit for a specified amount of time, the NCU 360 can issue a shutdown command to the ECM 358.

In some embodiments, the NCU 360 can communicate to both the ECM 385 and an AC power measuring module 378 via a well known CAN communication interface. A daisy-chain configuration can be used to broadcast information among the three devices. The ECM 358 can send a message to the NCU 360 informing that certain loads will be turned ON. The NCU 360 will shift the engine speed and CVP 362 speed ratio accordingly and then will respond back to the ECM 358 that the loads can be turned ON. The NCU 360 will send the ECM the engine speed periodically. In the event the NCU 360 detects a failure, it will send an error message to the ECM 358 to abort operation and shutdown. The NCU 360 can also receive messages from an AC power module 378 that monitors the active power of the generator. The AC power module 378 has an integrated circuit (IC) that reads in the AC current waveform using a transformer 380 and the AC voltage waveform via voltage divider. The IC computes the active power of the generator 352 and sends the value to the NCU 360 via CAN at a periodic rate.

Figure 22:
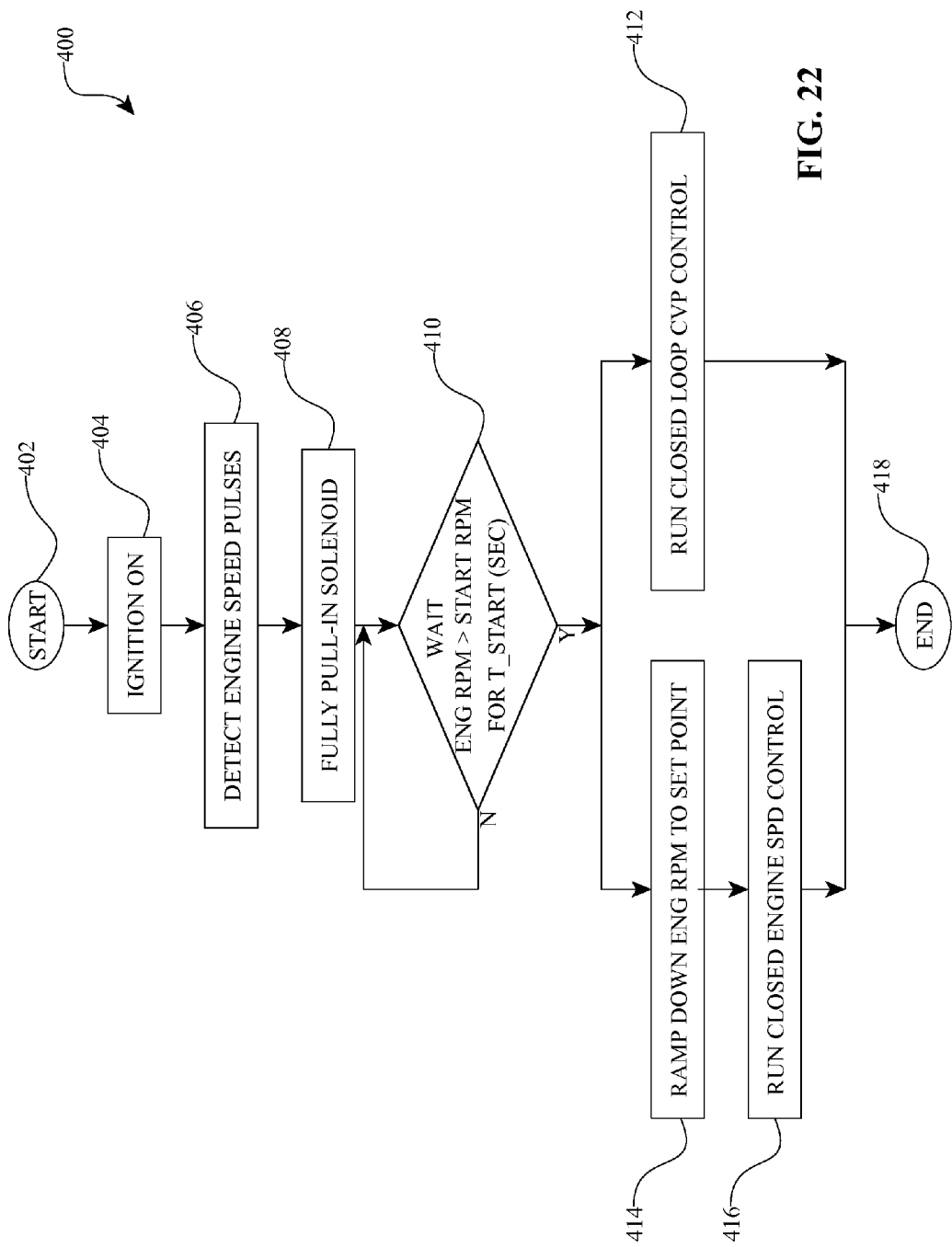
FIG. 22 is a flow chart of a control process that can be used with at least the APU of FIG. 21.

Turning now to FIG. 22, in one embodiment, a start-up control process 400 can be implemented in the operation of, for example, the APU 300. The control process 400 begins at a state 402 and then proceeds to a state 404 where ignition is turned on. The process 400 then moves to a state 406 where detection of engine speed is performed. In one embodiment, detection of engine speed involves detection of pulses from a speed sensor. The process 400 then proceeds to a state 408 where a command is sent to the fuel solenoid. In some embodiments, the command sent to the fuel solenoid is an indication that the solenoid is fully pulled in for maximum or minimum fuel command. The process 400 then proceeds to a state 410 where a comparison of the detected engine speed to a pre-set speed is made. In some embodiments, the state 410 has a pre-determined wait time before a positive or negative result is passed. If a negative result is provided by the state 410, the process 400 repeats the state 410. If a positive result is provided by the state 410, the process 400 proceeds substantially simultaneously to a state 412 and a state 414. A closed loop CVP control process is executed at the state 412. A command to reduce the engine speed to a pre-determined set point is sent at the state 414. The process 400 proceeds from the state 414 to a state 416 where a closed loop engine speed control process is executed. The process 400 proceeds from the state 412 and the state 416 to an end state 418.

Figure 23:
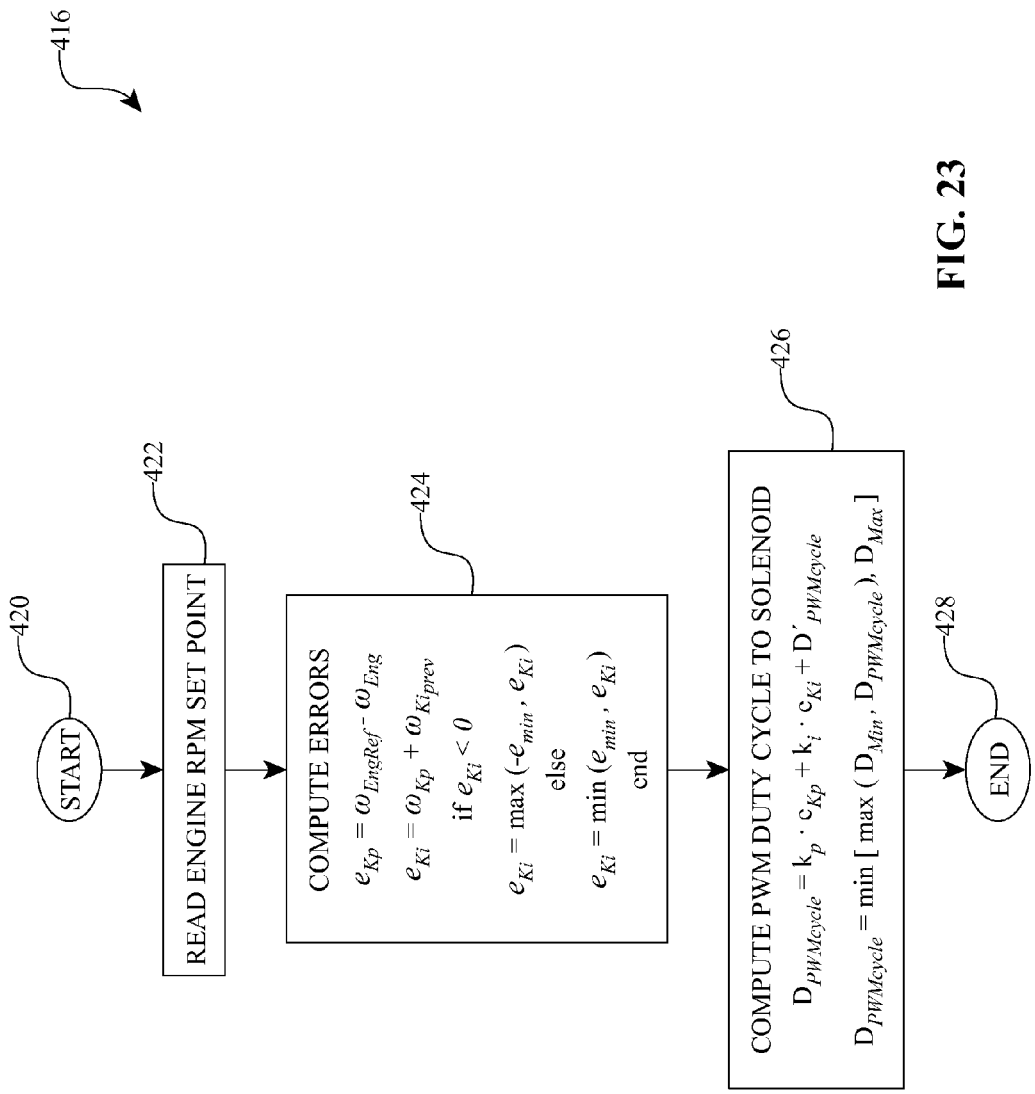
FIG. 23 is a flow chart of a control process that can be used with the control process of FIG. 22.

Referring now to FIG. 23, in one embodiment, the closed loop engine speed control process 416 can begin at a state 420 and proceed to a state 422. An engine speed set point is read at the state 422. The process 416 proceeds to a state 424 where errors are computed. As an illustrative example, equations for certain errors that can be computed at the state 424 are shown in FIG. 23, where $\omega_{EngRef}$=Engine set-point or reference
$\omega_{Eng}$=Measured engine speed
$e_{Kp}$=Proportional error
$e_{Ki}$=Integral error (accumulative)
$e_{Ki}$=Previous integral error
$e_{min}$=Minimum allowed accumulated error The process 416 proceeds to a state 426 where a command is calculated for a pulse-width-modulated (PWM) signal to be sent to the fuel solenoid. As an illustrative example, the equations that can be used for the calculation at the state 426 are provided in FIG. 23, where "$D_{PWMcycle}$" presents the duty cycle commanded to the solenoid, "$D'_{PWMcycle}$" represents the center or pivot duty cycle, "$D_{min}$" represents the minimum allowed duty cycle, and "$D_{max}$" represents the maximum allowed duty cycle. The process 416 then proceeds to an end state 428.

It should be noted that the NCU 304 can use 15-bit resolution for the solenoid PWM, and in some embodiments the max voltage corresponds a value of 32000. The PWM frequency for the solenoid controller is 600-Hz, while the control loop time is 10-ms. A duty cycle of 56% or (18000 register value) is required to fully pull-in the solenoid. Testing APU 300 has indicated that a center PWM value of 31.9% or (10200 register value) has shown stable results.

Figure 24:
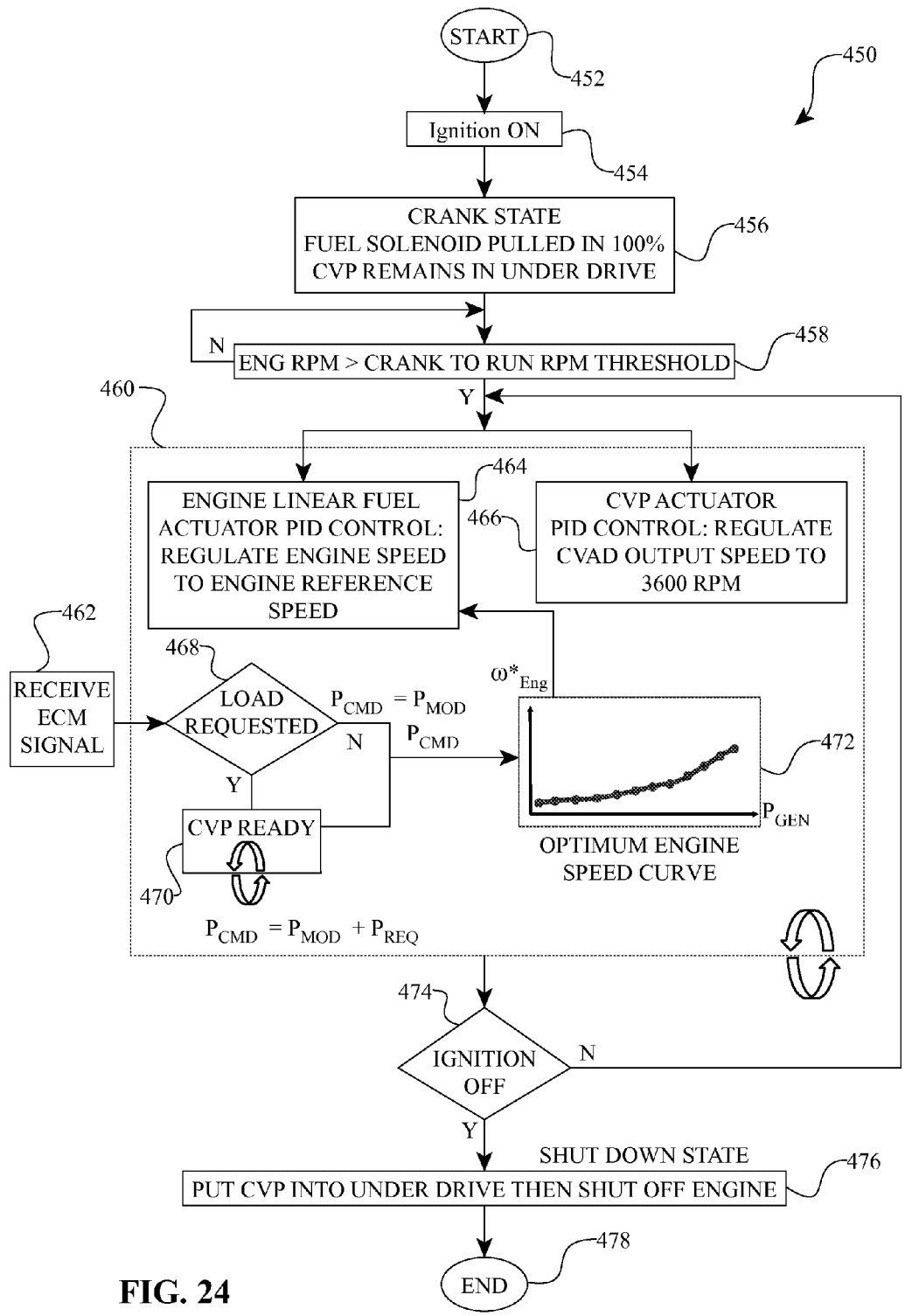
FIG. 24 is a flow chart of a control process that can be used with at least the APU of FIG. 21.

Turning now to FIG. 24, in one embodiment a control process 450 can be implemented with, for example, the APU 350. The control process 450 begins at a state 452 and proceeds to a state 454 where ignition "ON" status is confirmed. The process 450 proceeds to a state 456 to initiate the start of the engine 354, for example. The state 456 can be referred to as a crank state in which the fuel solenoid 366 is commanded full on and the CVP 362 is operated in underdrive. The control process 450 proceeds to a state 458 where the speed of the engine 354 is compared to a predetermined speed threshold to indicate that engine has transitioned from a cranking condition to a run condition. The control process 450 proceeds to a run state 460. In one embodiment, signals from the ECM 358 can be received at a state 462. In the run state 460, the control process 450 executes a fuel actuator process 464 and a CVP actuator process 466. The fuel actuator process 464 can be a PID control process for regulating the speed of the engine 354 based on a predetermined engine reference speed. The CVP actuator process 466 can be a PID control process for regulating the CVP output speed to maintain a constant speed of the generator 352, for example. In one embodiment, signals received at the state 462 can be sent to a state 468 where an evaluation of the requested load is performed. In some embodiments, the signal indicative of a load request is sent by a CAN message. The state 468 produces a positive result, for example, when an increase in load is detected. The state 468 produces a negative result, for example, when no load increase is detected. The process 450 proceeds to a state 470 confirms receipt of the message to the CVP 362. In other words, the state 470 is the confirmation "hand shake" that is sent from the NCU to the ECM via CAN indicating the CVP 362 is ready for additional loading from the HVAC unit. The CVP 362 will then wait for the load to turn ON before reading the AC power module. In one embodiment, the state 468 evaluates the power associated with a load request. For illustrative example, the equations that can be implemented in the state 468 are provided in FIG. 24, where Pcmd represents the commanded power to power all AC loads, Pmod represents the active power produced by generator measured with power module, Preq represents the additional power requested by the ECM 358 to turn ON a predictive load, for example, a load that the ECM 358 turns ON/OFF, for example the condenser. This is a pre-defined value that gets added to the current power reading from the AC power module. For reference, the term $\omega^*_{Eng}$ is shown in FIG. 24 and represents the reference engine speed set-point based on the optimum engine speed curve and Pcmd. Optimum pertains to minimize fuel consumption rate. The process 450 proceeds to an evaluation state 474 where the ignition signal is evaluated. A positive result from the state 474 indicates an "OFF" status of the ignition. The process 450 proceeds to a shutdown state 476 where the CVP 362 is shifted into underdrive. The process 450 ends at a state 478.

It should be noted that the description above has provided dimensions for certain components or subassemblies. The mentioned dimensions, or ranges of dimensions, are provided in order to comply as best as possible with certain legal requirements, such as best mode. However, the scope of the embodiments described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the disclosure. It will be appreciated, however, that no matter how detailed the foregoing appears in text, the disclosure can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated.

What we claim is:

1. A method of controlling an auxiliary power unit having an engine, a generator, and a continuously variable transmission (CVT) coupled to the engine and the generator, the method comprising the steps of:
    sensing a change in a load on the generator;
    adjusting the engine to correspond to said change in load; and
    adjusting the speed ratio of the CVT simultaneously with the adjustment of the engine.

2. The method of claim 1, further comprising the step of maintaining a constant speed of the generator.

3. The method of claim 2, wherein adjusting the speed ratio of the CVT comprises the step of tilting axes of a plurality of balls.

4. The method of claim 3, wherein tilting axes further comprises the step of applying a skew condition to the CVT.

5. The method of claim 1, wherein adjusting the engine comprises the step of commanding an engine actuator.

6. The method of claim 5, wherein commanding an engine actuator comprises the step of providing an engine speed set point.

7. The method of claim 5, wherein commanding an engine actuator comprises the step of providing an engine fuel rate set point.

8. The method of claim 3, wherein adjusting the speed ratio is based at least in part on a difference between a speed of the generator and a speed of the engine.

9. A method of controlling an auxiliary power unit (APU) having an engine, a generator, and a continuously variable transmission (CVT) coupled to the engine and the generator, the method comprising the steps of:

determining a change in load based at least in part on a signal from an accessory;

adjusting the engine to correspond to said change in load; and adjusting the speed ratio of the CVT simultaneously with the adjustment of the engine.

10. The method of claim 9, wherein determining a change in load comprises the step of receiving a signal from a blower.

11. The method of claim 9, wherein determining a change in load comprises the step of receiving a signal from an air conditioning system.

12. The method of claim 9, wherein determining a change in load comprises the step of receiving a signal from a heater.

13. The method of claim 11, wherein determining a change in load comprises the step of using a look-up table.

\* \* \* \* \*

UNITED STATES PATENT AND TRADEMARK OFFICE
CERTIFICATE OF CORRECTION

PATENT NO. : 8,845,485 B2
APPLICATION NO. : 13/438625
DATED : September 30, 2014
INVENTOR(S) : Smithson et al.

It is certified that error appears in the above-identified patent and that said Letters Patent is hereby corrected as shown below:

In the Specification

In column 10 at line 21, change " $T_p = P_{GEN}/(\eta_{GEN} * \eta_{CVT} * \omega_p)$ ,"

to -- $T_p = (P_{GEN}/(\eta_{GEN} * \omega_{GEN})) * (\omega_{GEN}/(\eta_{CVT} * \omega_p))$ --

Signed and Sealed this
Fourteenth Day of April, 2015

Michelle K. Lee
*Director of the United States Patent and Trademark Office*